(12) United States Patent
Oishi et al.

(10) Patent No.: US 8,008,846 B2
(45) Date of Patent: *Aug. 30, 2011

(54) FLAT DISPLAY APPARATUS

(75) Inventors: Toshiharu Oishi, Shizuoka-ken (JP);
Akihiko Horita, Shizuoka-ken (JP);
Ryusuke Fukushima, Shizuoka-ken (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,228

(22) Filed: Jan. 22, 2010

(65) Prior Publication Data

US 2010/0118391 A1    May 13, 2010

Related U.S. Application Data

(62) Division of application No. 11/984,079, filed on Nov. 13, 2007, now Pat. No. 7,768,182, which is a division of application No. 10/730,031, filed on Dec. 9, 2003, now Pat. No. 7,339,311.

(30) Foreign Application Priority Data

Dec. 10, 2002  (JP) .................. 2002-357617
Oct. 16, 2003  (JP) .................. 2003-356388

(51) Int. Cl.
*H01J 5/16*  (2006.01)
(52) U.S. Cl. ........................... 313/112; 313/479
(58) Field of Classification Search .............. 313/112, 313/479
See application file for complete search history.

(56) References Cited

U.S. PATENT DOCUMENTS

| 5,521,759 | A  | 5/1996  | Dobrowolski et al. |
| 6,255,778 | B1 | 7/2001  | Yoshikawa et al. |
| 6,410,841 | B1 | 6/2002  | Oh et al. |
| 6,417,619 | B1 | 7/2002  | Yasunori et al. |
| 6,469,685 | B1 | 10/2002 | Woodruff et al. |
| 6,965,191 | B2 | 11/2005 | Koike et al. |
| 2002/0046851 | A1 | 4/2002 | Marutsuka |
| 2003/0085649 | A1 | 5/2003 | Wachi et al. |
| 2004/0113533 | A1 | 6/2004 | Oh |
| 2004/0232813 | A1 | 11/2004 | Nakano et al. |

FOREIGN PATENT DOCUMENTS

| EP | 0782164 A1 | 7/1997 |
| EP | 0930637 A2 | 12/1998 |
| EP | 0908920 A2 | 4/1999 |
| EP | 0977060 A2 | 2/2000 |
| EP | 1056324 A2 | 11/2000 |
| EP | 1056325 A2 | 11/2000 |
| EP | 1069088 A1 | 1/2001 |
| EP | 1176436 A1 | 1/2002 |
| EP | 1199738 A2 | 4/2002 |
| EP | 1253816 A2 | 10/2002 |
| EP | 1275985 A2 | 1/2003 |
| EP | 1275986 A2 | 1/2003 |
| EP | 1280179 A2 | 1/2003 |
| EP | 1339082 A1 | 8/2003 |
| JP | 1-173090 | 7/1989 |
| JP | 10-187059 A | 7/1998 |

(Continued)

*Primary Examiner* — Vip Patel
(74) *Attorney, Agent, or Firm* — Arent Fox LLP

(57) ABSTRACT

An optical filter 17 is attached to the display screen surface of a flat display panel 3 of a flat display apparatus. The optical filter 17 is constituted of a lamination of an electromagnetic-wave blocking sheet 17A, an infrared-radiation absorbing and color-tone correcting sheet 17B and an ambient light antireflective sheet 17C.

8 Claims, 5 Drawing Sheets

FIRST EMBODIMENT

FOREIGN PATENT DOCUMENTS

| | | |
|---|---|---|
| JP | 10-214564 | 8/1998 |
| JP | 10-254372 | 9/1998 |
| JP | 11-065464 | 3/1999 |
| JP | 11-065464 A | 3/1999 |
| JP | 11-103192 | 4/1999 |
| JP | 11219122 A | 8/1999 |
| JP | 11-260265 | 9/1999 |
| JP | 11-272207 A | 10/1999 |
| JP | 11-282000 | 10/1999 |
| JP | 11-292575 A | 10/1999 |
| JP | 2000-156182 A | 6/2000 |
| JP | 2001-052633 A | 2/2001 |
| JP | 2001-266759 | 9/2001 |
| JP | 2002-116700 A | 4/2002 |
| JP | 2002-123179 A | 4/2002 |
| JP | 2002-198688 | 7/2002 |
| JP | 2002-251144 | 9/2002 |
| JP | 2002-258790 A | 9/2002 |
| KR | 10-2001-0039120 | 5/2001 |
| WO | WO-98/59335 A1 | 12/1998 |

FIRST EMBODIMENT

SECOND EMBODIMENT

THIRD EMBODIMENT

FOURTH EMBODIMENT

FLAT DISPLAY APPARATUS

The present application is a Divisional Application of application Ser. No. 11/984,079 filed Nov. 13, 2007, now U.S. Pat. No. 7,768,182 which is a Divisional Application of application Ser. No. 10/730,031 filed Dec. 9, 2003, now U.S. Pat. No. 7,339,311 which claims priority from Japanese Applications No. 2002-357617 and No. 2003-356388, the disclosures of which are incorporated herein by reference.

BACKGROUND OF THE INVENTION

1. Field of the Invention

This invention relates to the structure of flat display apparatuses.

2. Description of the Related Art

A flat display apparatus is equipped with a slim, flat display panel, such as a plasma display panel (hereinafter referred to as "PDP"), a field emission display panel (hereinafter referred to as "FED"), and the like.

For example, the PDP is structured such that a pair of front and back substrates are placed opposite in parallel to each other with a discharge space in between and the periphery of the discharge space is sealed.

More specifically, a reflection-type AC PDP has a plurality of row electrode pairs formed on the inner surface of the front substrate for the creation of a surface discharge (display discharge), and a dielectric layer covering the row electrode pairs. Further, on the inner surface of the back substrate facing the front substrate, a plurality of column electrodes are arranged in a direction at right angles to the row electrode pairs for the creation of a selection discharge between the column electrode and one row electrode in each row electrode pair, and a column electrode protective layer covers the column electrodes. Between the front substrate and the back substrate, a partition wall is formed for partitioning the discharge space into discharge cells, and phosphor layers of the three primary colors (i.e. red, green and blue colors) are respectively formed in all the discharge cells with the red, green and blue colors arranged in order.

FIG. 1 is a sectional side view illustrating a conventional flat display apparatus with a flat display panel such as the foregoing PDP mounted.

The conventional display apparatus has a flat display panel 3 which is fixed by an adhesive sheet 4 to the front surface (the upward surface in FIG. 1) of a chassis 2 seated forward of a rear case 1.

A frame 5 is attached to the front peripheral edge of the chassis 2 and surrounds the flat display panel 3. The frame 5 has an inner flange 5A formed in its front end. A front filter (panel protective plate) 7 is mounted on a gasket 6 placed on the front face of the inner flange 5A, and secured by a fitting 8.

FIG. 1 shows a front case 9 of the display apparatus.

FIG. 2 is a schematic side view illustrating the structure of the front filter (panel protective plate) 7 of the display apparatus.

In FIG. 2, the front filter (panel protective plate) 7 is constructed of an electromagnetic-wave blocking layer (conductive mesh) 7B formed on a glass substrate 7A; an antireflective layer 7C formed on the electromagnetic-wave blocking layer 7B; and an infrared-radiation absorbing and color-tone correcting layer 7D formed on the back surface of the glass substrate 7A.

Such a conventional flat display apparatus is described in Japanese Patent Laid-open application No. Hei. 11-219122.

As described hitherto, conventional flat display apparatuses have a front filter (panel protective plate) placed forward of the flat display panel. The front filter is structured such that a film for preventing the reflection of ambient light and films for blocking electromagnetic waves and infrared radiation generated from the flat display panel are attached to a glass substrate. This structure makes the front filter very expensive. Therefore the conventional flat display apparatuses have the problem of increased production costs.

SUMMARY OF THE INVENTION

It is an object of the present invention to solve the problem associated with the conventional flat display apparatuses as described above.

More specifically, an object of the present invention is to provide a flat display apparatus capable of reducing production costs.

To attain the object, the present invention provides a flat display apparatus having a flat display panel. The flat display apparatus has the feature of including a protective sheet attached to the display screen surface of the flat display panel.

With the flat display apparatus according to the present invention, the protective sheet is attached integrally to the display surface of the flat display panel. Hence the elimination of the conventional need for providing, independently of the flat display panel, a protective panel for protecting the display surface of the flat display panel is achieved, and therefore a reduction in the number of parts and a simplification in the structure for supporting a flat display panel becomes possible, thus reducing production costs.

These and other objects and features of the present invention will become more apparent from the following detailed description with reference to the accompanying drawings.

DETAILED DESCRIPTION OF THE PREFERRED EMBODIMENTS

Preferred embodiments according to the present invention will be described below in detail with reference to the accompanying drawings.

Figure 3:
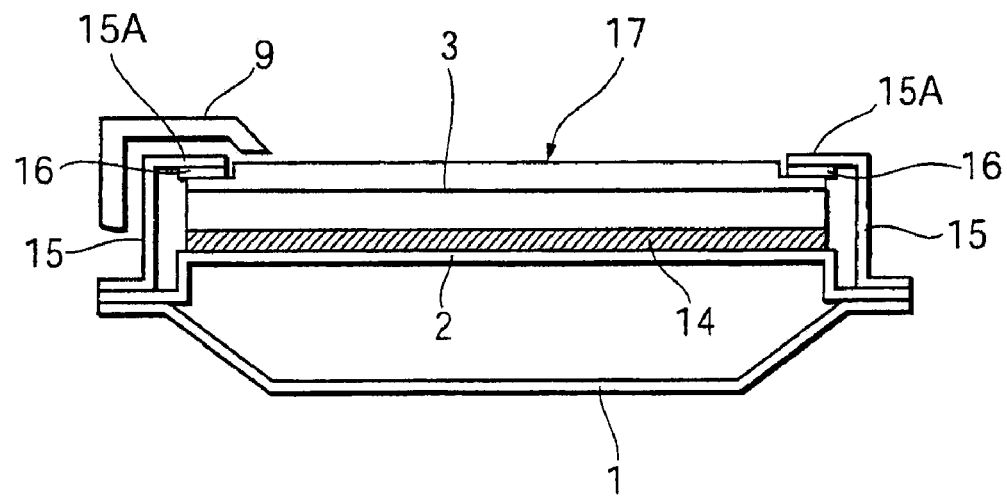
FIG. 3 is a sectional side view illustrating an embodiment according to the present invention.

FIG. 3 is a sectional side view illustrating a first embodiment of the flat display apparatus according to the present invention.

Figure 1:
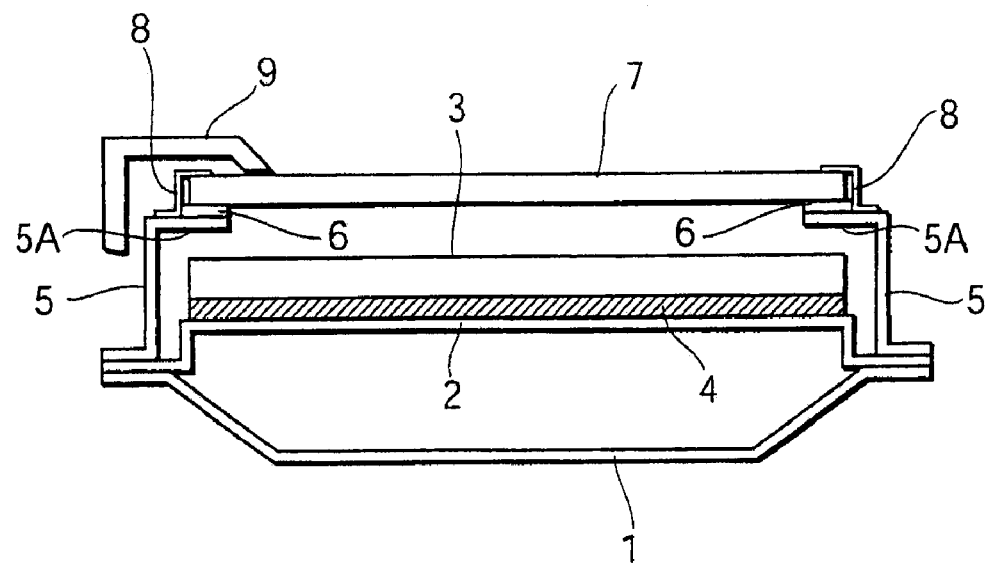
FIG. 1 is a sectional side view illustrating the structure of a conventional flat display apparatus.
Figure 2:
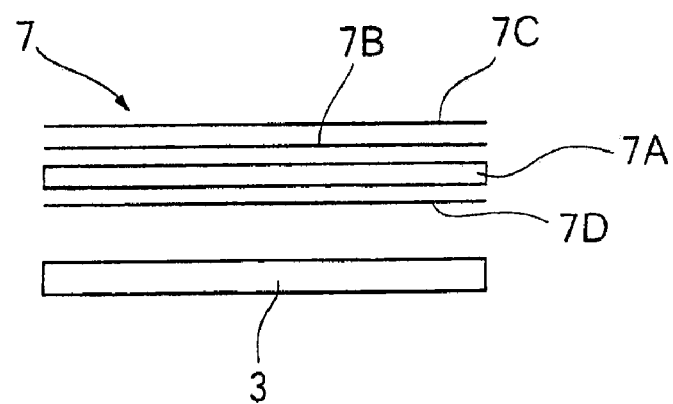
FIG. 2 is a schematic side view illustrating the structure of a conventional front filter.

In FIG. 3 the same structural components as those in the conventional apparatus described in FIG. 1 are designated by the same reference numerals as those in FIG. 1.

The flat display apparatus in the first embodiment has a flat display panel 3 supported on a chassis 2 by means of an elastic sheet 14. The elastic sheet 14 is formed of a foam material such as foam rubber of a 30 or less degrees hardness which is capable of absorbing the distortion occurring when mounting and the heat dissipated. To the display screen surface of the flat display panel 3, an optical filter 17 is attached as a protective sheet.

Figure 4:
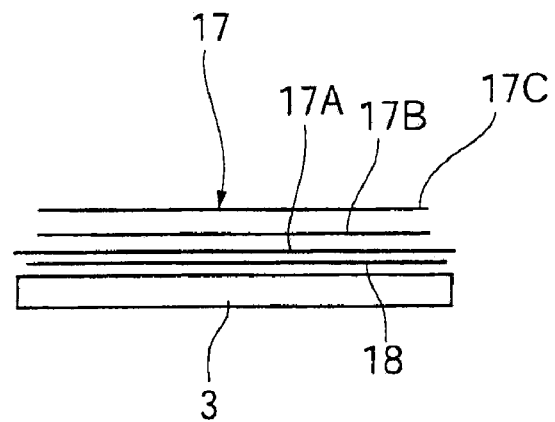
FIG. 4 is a schematic side view illustrating the structure of an optical filter in the embodiment.

As schematically illustrated in FIG. 4, the optical filter 17 is formed by laminating an infrared-radiation absorbing and color-tone correcting sheet 17B on an electromagnetic-wave blocking sheet 17A, and further laminating an ambient-light antireflective sheet 17C on the infrared-radiation absorbing and color-tone correcting sheet 17B.

Figure 5:
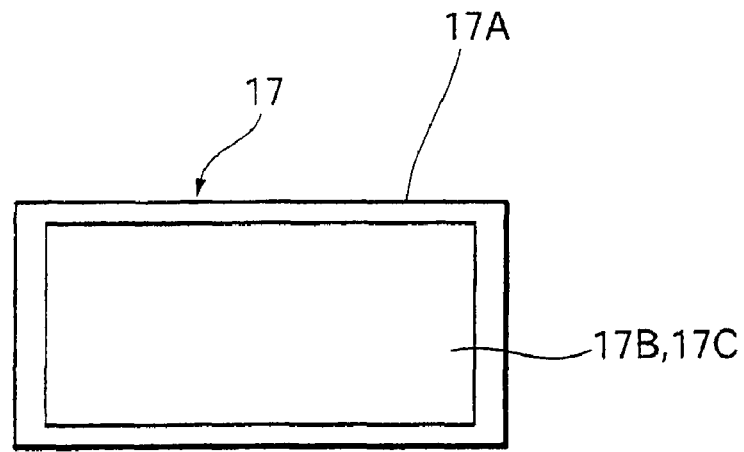
FIG. 5 is a plan view of the optical filter in the embodiment.

The length and width dimensions of the infrared-radiation absorbing and color-tone correcting sheet 17B and the ambient-light antireflective sheet 17C are somewhat smaller than those of the electromagnetic-wave blocking sheet 17A. As illustrated in FIG. 5, the peripheral edge of the electromagnetic-wave blocking sheet 17A projects outward from the outer edge of the infrared-radiation absorbing and color-tone correcting sheet 17B and ambient-light antireflective sheet 17C, so that the metal pattern layer of the electromagnetic-wave blocking sheet 17A is exposed to form an earth connecting part as will be described later.

The optical filter 17 is attached directly to the flat display panel 3 by adjoining the electromagnetic-wave blocking sheet 17A to the display panel 3 by use of a filter-laminating adhesive material 18.

The filter-laminating adhesive material 18 used for attaching the optical filter 17 to the flat display panel 3 is made of an acrylic-type or a silicon-type transparent material and has a refractive index differing by 0.2 or less from the refractive index or each of the refractive indexes of one or both of the optical filter 17 and the substrate (the front glass substrate in PDPs) constituting the display screen of the flat display panel 3, for example, it has a refractive index ranging from 1.4 to 1.6.

Further, the filter-laminating adhesive material 18 used has an adhesive strength of 3 kgf/inch or less when being vertically detached.

The optical filter 17 with the filter laminating adhesive material 18 is designed to be greater than or equal to 0.5 mm thick.

The flat display panel 3 having the optical filter 17 attached to the display side surface is supported on a chassis 2. A frame 15 is attached to the front-face peripheral edge of the chassis 2 and has an inner flange 15A formed in its front end. The inner flange 15A makes contact with an electrically-conductive gasket 16 adjoining the area of the optical filter 17 in which the electromagnetic-wave blocking sheet 17A is exposed, so as to sandwich the gasket 16 between itself and the optical filter 17, thereby clamping the flat display panel 3 to the chassis 2.

In place of the gasket, a spring member may be used.

Reference numeral 9 in FIG. 3 denotes a front case of the display apparatus.

Because the optical filter 17 is integrally attached to the display screen surface of the flat display panel 3, the flat display apparatus according to the present invention does not need a protective panel provided independently of the flat display panel for protecting the display screen surface of the flat display panel 3 as in the conventional techniques, so that the number of parts is decreased and the supporting structure for the flat display panel 3 is simplified to make low costs of production possible.

Further, the flat display apparatus is designed such that the optical filter 17 is attached directly to the display surface of the flat display panel 3, and the refractive index of the filter laminating adhesive material 18 used for attaching the optical filter 17 is determined to differ by 0.2 or less from the refractive index of the optical filter 17 or the substrate which constitutes the display surface of the flat display panel 3, for example in a range of from 1.4 to 1.6 so as to be approximately equal to the refractive index of the glass substrate constituting part of the flat display panel 3. This design eliminates the reflection (about 8 percent) of the emitted light from the flat display panel 3 which occurs due to an air space produced between a flat display panel and a protective panel in the conventional display apparatuses, thereby making possible to improve the brightness and to prevent the contrast deterioration caused by the rebounding of the reflected light to the non-light emission area of the display panel.

More specifically, in the conventional display apparatuses having an air space produced between the flat display panel and the protective panel, generally, a little over 8 percent of the light generated in the flat display panel reflects off the interfaces of the flat display panel and protective panel to the air space and returns to the inside of the panel. At this point, the returning light is diffusely reflected light, and therefore it may illuminate a not-light emission section adjacent to the light emission section of the panel.

PDPs, in particular, include a phosphor layer formed in the panel. The reflectance of the phosphor layer is the order of 30 percent, and therefore the phosphor layer reflects the returning light (i.e. the reflected light from the interface of the flat display panel or the protective panel). Because of this reflection, it appears that light emission is caused from the not-light emission section as well as the light emission section. Hence the outline of the light emission section is blurred, leading to a risk of losing the vigor and quality of an image to be displayed.

Further, recently, for the flat display panels, attempt has been made to reduce the black luminance, but the reflection of the returning light as described above may affect the reducing effectiveness of the black luminance to decrease the reducing effectiveness.

In the aforementioned flat display apparatus, the interfaces of the flat display panel 3 and the optical filter 17 are attached to each other by the filter laminating adhesive material 18 having the refractive index differing by 0.2 or less from the refractive index of the flat display panel 3 and optical filter 17. For this reason, the reflection of light off the interfaces is suppressed, leading to the prevention of loss of vigor and quality of an image, and also the prevention of a decrease in the reducing effectiveness of the black luminance in regard to the flat display panels attempted to reduce the black luminance.

For a further increase in the foregoing effectiveness of preventing lowering in the vigor and quality of an image and of preventing a decrease in a reduction ratio of the black luminance, when the flat display panel 3 is a PDP, the driving control is performed on a discharge, e.g. a decrease in the intensity of a discharge, a reduction in the number of discharges generated, and the like, such that a luminance of 1 $cdm^2$ or less is provided by a discharge (e.g. a preliminary discharge such as a reset discharge, a priming discharge, an addressing discharge and the like which are caused without having direct bearing on the displaying) except the display discharge for light emission for forming an image.

Further, the foregoing flat display apparatus uses, for the filter-laminating adhesive material 18, a material of an acrylic-type or a silicon-type having an adhesive strength of 3 kgf/inch or less when being vertically detached, to make it possible to separate the flat display panel 3 and the optical filter 17 for repair without damaging the bases of the flat display panel 3 and the optical filter 17.

Still further, the determination of a 0.5 or more mm thickness for the optical filter 17 including the filter-laminating adhesive material 18 makes it possible to maintain a shock absorbing property against a shock from the outside, and to prevent fracture of the flat display panel.

Yet further, the lamination of the optical filter 17 with the electromagnetic-wave blocking sheet 17A side located adjacent to the flat display panel 3 results in provision of a relatively stable shield member interposed between the flat display panel 3 and the infrared-radiation absorbing and color-tone correcting sheet 17B, which includes dyes tending to suffer degradation from heat or light. This interposition makes possible to lessen the effect of the heat and light produced from the flat display panel upon the infrared-radiation absorbing and color-tone correcting sheet 17B.

Note that by providing a transmittance-reducing component between the electromagnetic-wave blocking sheet 17A and the flat display panel 3, a relaxation of the acceptable standard of appearance relating to irregular blackening of the electromagnetic-waveblocking sheet 17A and the like becomes possible.

Further, the electromagnetic-wave blocking sheet 17A of the optical filter 17 is formed somewhat larger than the infrared-radiation absorbing and color-tone correcting sheet 17B and ambient light antireflective sheet 17C which are to be laminated on the electromagnetic-wave blocking sheet 17A. Therefore the outer peripheral edge of the electromagnetic-wave blocking sheet 17A projects beyond the outer periphery of the infrared-radiation absorbing and color-tone correcting sheet 17B and ambient light antireflective sheet 17C. Thus, it is possible to facilitate connecting the electromagnetic-wave blocking sheet 17A to an earth.

Further, the flat display apparatus according to the present invention is capable of absorbing and lessening an impact force exerted from the outside, due to the use of a foam material having a hardness of 30 or less degrees for the elastic sheet 14 which is provided for supporting the flat display panel 3 on the chassis 2.

Still further, in the flat display apparatus according to the present invention, the flat display panel 3 is fixed on the chassis 2 by being clamped between the frame 15 and the chassis 2 by use of interposition of the conductive gasket 16 without the use of an adhesive sheet as in the conventional techniques. Accordingly, the recycling and replacement work on the flat display panel become much easier as compared with a conventional case when the flat display panel 3 is fixed by use of an adhesive sheet.

In addition, the earth connecting part formed on the outer edge of the optical filter 17 is supported between the conductive gasket 16 and the optical filter 17. Thus, the fixing of the display panel by the frame 15 and the electric connection with the optical filter 17 are achieved simultaneously. This makes possible a decrease in the number of parts, resulting in the possibility of reducing production costs.

Moreover, in the first embodiment, the order of lamination of the electromagnetic-wave blocking sheet, the infrared-radiation absorbing and color-tone correcting sheet, and the ambient light antireflective sheet in the optical filter is not limited to that illustrated in FIG. 4. For example, the electromagnetic-wave blocking sheet and the ambient light antireflective sheet may be laminated in order onto the infrared-radiation absorbing and color-tone correcting sheet.

FIG. 3 illustrates the structure when the panel 3 is clamped between the frame 15 and the chassis 2 with the interposition of the conductive gasket 16 to be mounted on the chassis 2. However, an adhesive layer may be provided on each of the front and back surfaces of the foam material forming the elastic sheet 14, and the panel may be fixed mounted on the chassis by means of the adhesive layers.

Figure 6:
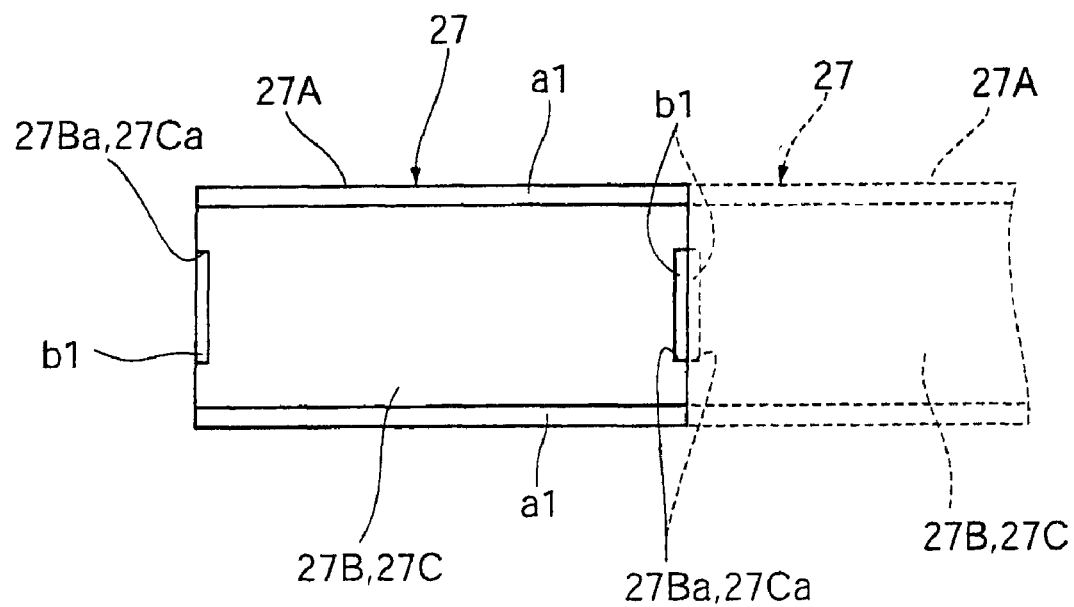
FIG. 6 is a plan view illustrating another type of the optical filter.

FIG. 6 is a plan view illustrating another structure of an optical filter in a second embodiment.

An optical filter 27 in illustrated in FIG. 6 includes an electromagnetic-wave blocking sheet 27A having the width in the vertical direction greater than the vertical width of an infrared-radiation absorbing and color-tone correcting sheet 27B and an ambient light antireflective sheet 27C. Both the upper end and lower end of the electromagnetic-wave blocking sheet 27A project beyond the infrared-radiation absorbing and color-tone correcting sheet 27B and ambient light antireflective sheet 27C. However, the electromagnetic-wave blocking sheet 27A has the same width in the horizontal direction as that of the infrared-radiation absorbing and color-tone correcting sheet 27B and the ambient light antireflective sheet 27C.

The infrared-radiation absorbing and color-tone correcting sheet 27B and ambient light antireflective sheet 27C have aligned recesses 27Ba and 27Ca formed in the same position in the central portion of each of the right and left ends, so that an end part of the electromagnetic-wave blocking sheet 27A is exposed inside each set of the recesses 27Ba, 27Ca.

The optical filter 27 is connected town earth at the upper and lower projecting end portions a1 of the electromagnetic-wave blocking sheet 27A and at portions b1 exposed inside the sets of recesses 27Ba, 27Ca.

The structure of the optical filter 27 of the flat display apparatus as described above enables the following manufacturing method: as indicated by the broken line in FIG. 6, the electromagnetic-wave blocking sheet 27A, the infrared-radiation absorbing and color-tone correcting sheet 27B and the ambient light antireflective sheet 27C are formed in a strip shape and rolled up in a scroll shape; and the scrolled sheets 27A, 27B and 27C are then unrolled in the strip form and laminated to one another (at this stage, the strip-form infrared-radiation absorbing and color-tone correcting sheet 27B and ambient light antireflective sheet 27C have already undergone the punching process for forming the recesses 27Ba and 27Ca). The adoption of this manufacturing method makes it possible to significantly reduce the manufacturing costs for the optical filter 27.

In the structure illustrated in FIG. 6, the two sets of recesses 27Ba, 27Ca are formed respectively in the right and left ends of the laminated infrared-radiation absorbing and color-tone correcting sheet 27B and ambient light antireflective sheet 27C. However, a set of recesses 27Ba, 27Ca may be formed in a single position, or alternatively three or more sets of recesses 27Ba, 27Ca may be formed.

Figure 7:
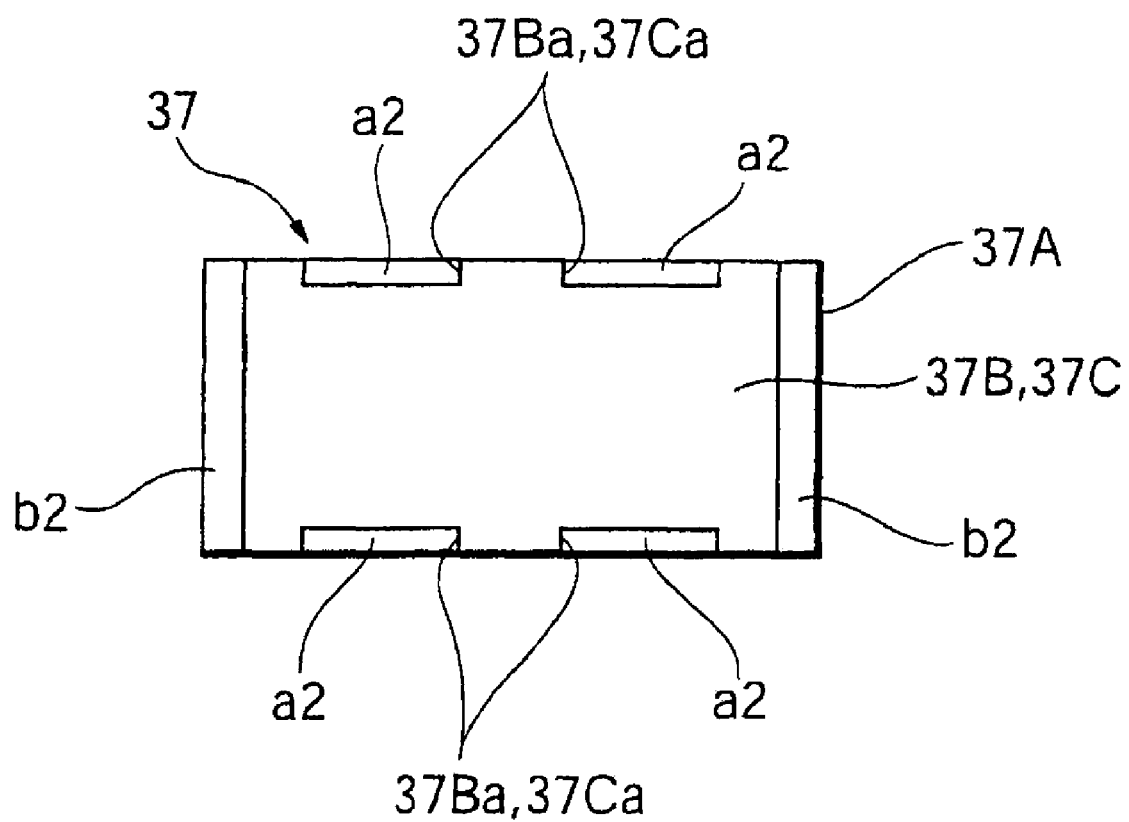
FIG. 7 is a plan view illustrating yet another type of the optical filter.

FIG. 7 is a plan view illustrating yet another structure of an optical filter in a third embodiment.

In the optical filter 37 illustrated in FIG. 7, an electromagnetic-wave blocking sheet 37A has the same width in the vertical direction as the vertical width of an infrared-radiation absorbing and color-tone correcting sheet 37B and an ambient light antireflective sheet 37C. However, the electromagnetic-wave blocking sheet 37A has the width in the horizontal direction greater than the horizontal width of the infrared-radiation absorbing and color-tone correcting sheet 37B and the ambient light antireflective sheet 37C. Each of the right and left ends of the electromagnetic-wave blocking sheet 37A projects beyond the infrared-radiation absorbing and color-tone correcting sheet 37B and the ambient light antireflective sheet 37C.

The infrared-radiation absorbing and color-tone correcting sheet 37B and the ambient light antireflective sheet 37C have aligned sets of recesses 37Ba, 37Ca formed in their upper and lower ends. An end part of the electromagnetic-wave blocking sheet 37A is exposed inside each set of the recesses 37Ba, 37Ca.

In the structure illustrated in FIG. 7, the two sets of recesses 37Ba, 37Ca are formed on each of the upper and lower ends of the laminated infrared-radiation absorbing and color-tone correcting sheet 37B and ambient light antireflective sheet 37C. However, a set of recesses 37Ba, 37Ca, or alternatively three or more sets of recesses 37Ba, 37Ca may be formed in each of the upper and lower ends.

The optical filter 37 is connected to an earth at portions a2 of the electromagnetic-wave blocking sheet 37A exposed inside the recesses 37Ba, 37Ca and at right and left projecting end portions b2 of the electromagnetic-wave blocking sheet 37A.

Figure 8:
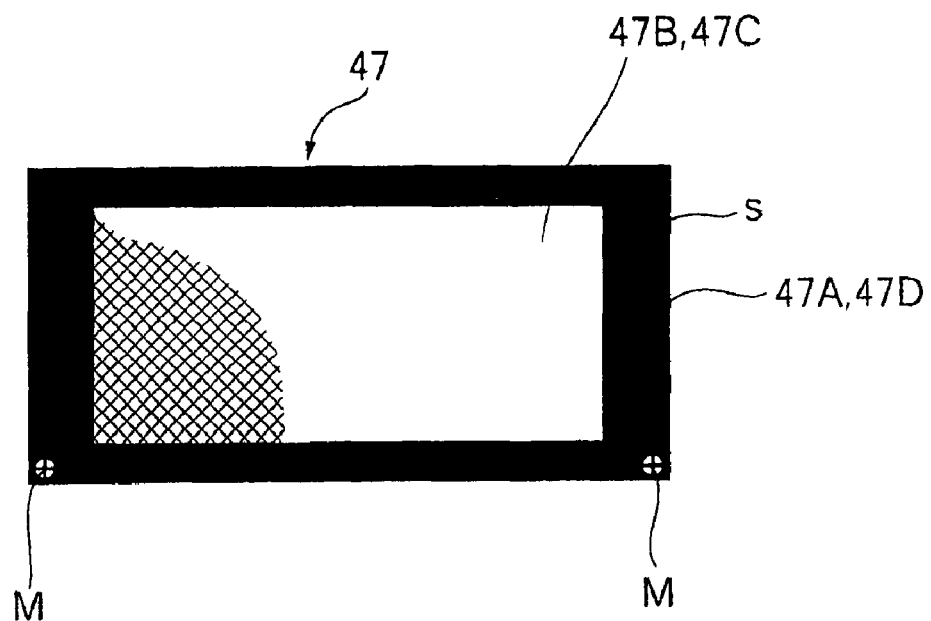
FIG. 8 is a plan view illustrating still another type of the optical filter.
Figure 9:
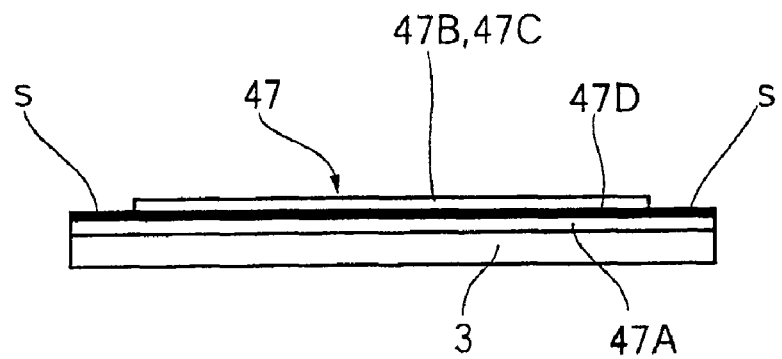
FIG. 9 is a side view of the optical filter in FIG. 8.

FIGS. 8 and 9 are a plane view and a side view illustrating still another structure of an optical filter in a fourth embodiment.

As in the case of the optical filter 17 in the first embodiment, the optical filter 47 in the fourth embodiment has an electromagnetic-wave blocking sheet 47A having vertical and horizontal dimensions somewhat greater than those of an infrared-radiation absorbing and color-tone correcting sheet 47B and an ambient light antireflective sheet 47C. Therefore, the peripheral end of the electromagnetic-waveblocking sheet 47A projects beyond the outer periphery of the infrared-radiation absorbing and color-tone correcting sheet 47B and the ambient light antireflective sheet 47C, so that the metal pattern layer of the electromagnetic-wave blocking sheet 47A is exposed to form an earth connecting part s.

Further, on the surface of the electromagnetic-wave blocking sheet 47A of the optical filter 47, a black metal film or blacking-treated coating 47D is provided, and therefore the earth connecting part s formed on the outer peripheral end portion of the electromagnetic-wave blocking sheet 47A takes the so-called full-face electrode form.

An even number of registration marks M are formed in selected positions of the earth connecting part s for the lamination of the optical filter 47 and the flat display panel (FIG. 8 shows two registration marks M in the lower corners of the optical filter 47, as an example).

The registration mark M is formed by punching a circle-shaped or a cross-shaped hole, for example, in the electromagnetic-wave blocking sheet 47A.

Thus, due to the black coating 47D formed on the electromagnetic-wave blocking sheet 47A, the optical filter 47 illustrated in FIGS. 8 and 9 is capable of suppressing the reflection of ambient light from the electromagnetic-wave blocking sheet 47A to make it possible to improve the contrast of an image to be displayed.

The provision of the registration marks M on the optical filter 47 makes possible easy and precise registration when the optical filter 47 is laminated and attached to the flat display panel by use of image-processing techniques or the like in the manufacturing process.

A generic concept of the flat display apparatus in the foregoing embodiment is a flat display apparatus including a flat display panel and a protective sheet attached to the display screen surface of the flat display panel.

With a flat display apparatus based on the generic concept, the protective sheet is attached integrally to the display surface of the flat display panel. Hence the elimination of the conventional need for providing, independently of the flat display panel, a protective panel for protecting the display surface of the flat display panel is achieved, and therefore a reduction in the number of parts and a simplification in structure for supporting a flat display panel becomes possible, thus achieving low costs of production.

The terms and description used herein are set forth by way of illustration only and are not meant as limitations. Those skilled in the art will recognize that numerous variations are possible within the spirit and scope of the invention as defined in the following claims.

What is claimed is:

1. A flat display apparatus comprising:
a flat display panel; and
an optical filter bonded to a display screen surface of the flat display panel by a transparent adhesive material, the optical filter including an electromagnetic-wave blocking layer and an infrared-radiation absorbing and color-tone correcting layer, with the electromagnetic-wave blocking layer laminated closer to the flat display panel than the infrared-radiation absorbing and color-tone correcting layer,
wherein an outer edge portion of the electromagnetic-wave blocking layer of the optical filter is exposed from the infrared-radiation absorbing and color-tone correcting layer and serves as an earth connecting portion.

2. The flat display apparatus according to claim 1, wherein the refractive index of the transparent adhesive material is 1.4-1.6.

3. The flat display apparatus according to claim 1, wherein the thickness of the optical filter bonded to the flat display panel, including the thickness of the transparent adhesive material, is 0.5 mm or more.

4. The flat display apparatus according to claim 1, wherein the optical filter further includes an ambient light antireflective layer, and is formed by laminating at first the electromagnetic-wave blocking layer, then the infrared-radiation absorbing and color-tone correcting layer, and finally the ambient light antireflective layer.

5. The flat display apparatus according to claim 4, wherein the area of the electromagnetic-wave blocking layer is made larger than the area of each of the infrared-radiation absorbing and color-tone correcting layer and the ambient light antireflective layer, thereby exposing the outer edge portion of the electromagnetic-wave blocking layer.

6. The flat display apparatus according to claim 4, wherein a notch is formed in the infrared-radiation absorbing and color-tone correcting layer as well as in the ambient light antireflective layer, thereby exposing the electromagnetic-wave blocking layer within the notch.

7. The flat display apparatus according to claim 1, wherein a black coating is formed on the earth connecting portion which is provided in a non-displaying area of the outer edge portion of the flat display panel.

8. The flat display apparatus according to claim 7, wherein position aligning marks are formed on the black coating.

* * * * *